R. THEUMER AND F. SCHAR.
FRICTION ACTUATED SCREW PRESS, &c.
APPLICATION FILED APR. 16, 1920.
1,363,932.
Patented Dec. 28, 1920.
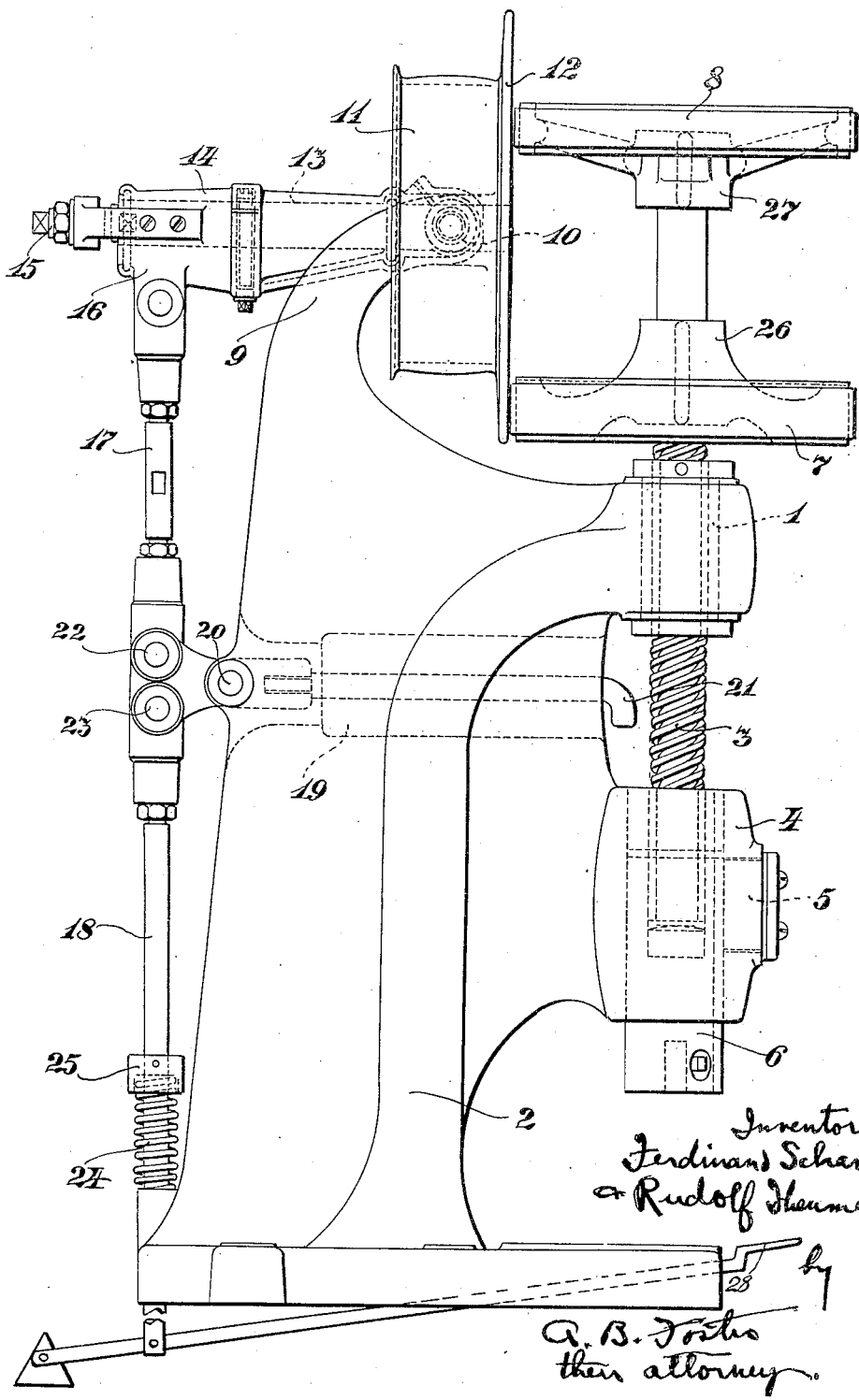

UNITED STATES PATENT OFFICE.

RUDOLF THEUMER, OF VIENNA, AND FERDINAND SCHAR, OF SCHWECHAT, NEAR VIENNA, AUSTRIA.

FRICTION-ACTUATED SCREW-PRESS, &c.

1,363,932.  Specification of Letters Patent.  Patented Dec. 28, 1920.

Application filed April 16, 1920. Serial No. 374,511.

*To all whom it may concern:*

Be it known that we, RUDOLF THEUMER, engineer, a citizen of the Republic of Austria, residing at Vienna XVIII, Hasenauerstrasse 5, and FERDINAND SCHAR, manufacturer, a citizen of the Republic of Austria, residing at Schwechat, near Vienna, Austria, have invented certain new and useful Improvements in a Friction-Actuated Screw-Press, Particularly for Punching, Bending, and Drawing Operations, of which the following is a specification.

This invention relates to a screwpress, which is actuated by friction discs and which is particularly adapted for performing punching-, bending- and drawing operations. With the known friction presses, especially with those provided with a small spindle diameter, these operations cannot be performed in a satisfactory manner, as their construction possess great defects, which on performing the operations above referred to, are of considerable disadvantage for the reason, that the lifting of the spindle has to be performed by the drive alone for the want of a counter-pressure by the piece of work. It has been shown, that on performing the above mentioned operations it is very difficult to raise the spindle and it frequently happens, that they remain in the lowest position, which causes the friction disc to slide over the leather-covered face of the flywheel, thereby injuring and frequently burning through the leather covering. Further, the friction presses with small spindle-diameter have the defect, that the two driving friction discs, arranged on both sides of the spindle, e. g. to the right and left, as well as the driving belt pulley, are located at about the height of a man's head when the man is standing close to the press so that danger to the operator arises during the working operations, and at the same time the space between two or more presses situated side by side cannot be properly economized.

The before mentioned defects are removed by the screw-press constructed according to the present invention, as owing to its particular construction an easy lifting of the spindle is insured and a jamming or remaining of the spindle in the lowest position, even during the punching, bending, or drawing operations, is rendered impossible, while on the other hand the driving members are so located that the press is easily accessible from three sides at the level of a workman's head.

According to the present invention, the desired objects are attained by providing only a single rotatable and pivotally movable or swinging driving friction disc behind the spindle, by which rotary motion is imparted to the spindle in both rotary directions, e. g. for the upward as well as downward movement of the ram of the press. The spindle can be rotated in both directions by rotating the driving friction disc in one direction only, this being rendered possible by making the contacting face of the driving friction disc slightly cone-shaped and arranging the same opposite two friction discs, located one above the other, with which the beveled face of the driving disc is alternately brought into engagement in such manner, that the upper half of the driving disc contacts with the upper friction disc and the lower half of the driving disc with the lower friction disc. The result is, that the initiation of the rotary motion of the spindle is always effected near the center of the driving disc, e. g. in the place where the driving disc has the lowest circumferential speed, so that even a heavy flywheel mass may easily take up the rotary motion without the danger of sliding. Thus a very easy, smooth and shockless start of the press is assured.

By actuating the press in both rotary directions by means of a single friction disc, it is possible to construct the press with a one-armed frame and to arrange the driving disc with its belt drive behind the spindle, so that the front as well as both sides of the spindle remain free and are easily accessible and no movable parts are in man's height.

A convenient mode of carrying out the present invention is illustrated in side-elevation in the accompanying drawing.

According to the illustrated construction, the frame 2 is furnished with a screw-threaded nut or bearing 1, which coöperates with a screw-threaded spindle 3. A ram 6 is carried on the lower end of the spindle 3, the said ram being adapted to slide in a circular guide 4 of the frame 2 and is secured against rotation by a wedge 5. The upper end of the spindle carries two friction discs 7 and 8.

Further, the frame 2 is furnished with an extension 9 which projects toward the spindle. This extension carries bearings 10 for the slightly cone-shaped or beveled friction disc 12; the latter being provided with a lateral rim, which forms the belt pulley 11 for driving the disc 12. The shaft 13 of the driving friction disc 12 rests in a self-lubricating bearing 14 and may be suitably adjusted by means of a screw-nut 15. The self-lubricating bearing 14 is furnished with lateral projections which rest in the bearings 10, and the rear end of the said bearing 14 is provided with an extension or eye 16, to which a connecting rod 17 of the reverser is joined. The reverser further comprises a connecting rod 18 and a lever 19, traversing the support 2 and located in the mean-plane of the spindle and support. The said lever is movable around a pin 20, and the free end thereof extends into the path of movement of the ram 6. The rear end of the lever 19 is furnished with two eyes 22, 23, which are joined to the connecting rods 17 and 18 respectively, the latter rod being connected to a pedal 28 and continuously pressed upward by a helical spring 24 resting against an adjustable stop 25.

The operation of the above described screw-press is as follows:—

On pulling the rear portion of the bearing 14 downward, by stepping upon the pedal 28, the motion being imparted by connecting rods, 17 and 18, the lower part of the beveled friction disc 12 is pressed against the lower friction disc 7, which is in its highest position. Thereby the friction disc 7 and consequently also the spindle 3 are rotated, and the ram is forced downwardly with increasing speed. On the release of the pedal, the rods 17, 18 move upwardly under the action of the spring 24 and thereby push the bearing 14 upwardly and swing the driving friction disc 12 around its pivot, until the upper half of the latter comes into contact with the upper friction disc 8, which is now in its lowest position. The latter is thereby rotated in opposite direction to the downward motion of the spindle, and the ram raised without much exertion. An accelerating motion is also given to disc 8, and spindle 3 during the lifting operation, and in order to prevent the spindle being raised too high, the movement of the spindle is automatically reversed by the ram 6 coming into contact with the end 21 of the lever 19, which causes the latter to swing around its pivot 20 and thereby move the rods 17 and 18 downwardly. Consequently the bearing 14 and the driving friction disc 12 swing around their pivot 10, so that the lower half of this disc 12 and the friction disc 7 again come into contact. The rotary motion of the spindle is thereby reversed and the upward movement of the same prevented.

As illustrated in the drawing, the belt pulley 11 swings around its center and its rim is so crowned, that the center of the crown lies in the middle of the rotary or movable bearing 10, whereby any variation in the tension of the belt is rendered impossible. The friction discs 7 and 8 are of bell-shaped construction, e. g. the rim and boss 26 of the lower flywheel 7 and the rim and boss 27 of the upper flywheel 8 extend beyond the front of the rim and boss respectively, whereby the free end of the spindle may be shortened and the flywheel mass lie as low as possible, in order to reduce the lateral pressure of the spindle against the wall of the screw-threaded nut or bearing 1, when the beveled friction disc 12 presses against the friction disc 7 or 8 respectively.

Having thus described our invention, what we claim as new, and desire to secure by Letters Patent, is—

1. A friction-actuated screw-press particularly for punching-, bending- and drawing operations, comprising in combination, a spindle adapted to be rotated in either rotary direction, a ram secured to one end of the spindle, friction members secured to the other end of the said spindle, and a rotatable and pivotally movable driving friction member secured to the said frame at one side of the spindle, the said driving friction member being rotatable in one direction only and adapted to coöperate alternately with each one of the said friction members in order to rotate the spindle in either rotary direction and thereby raise and lower the said ram substantially as described.

2. A friction-actuated screw-press particularly for punching-, bending- and drawing operations, comprising in combination, a screw threaded spindle adapted to be rotated in either rotary direction, a ram secured to one end of the spindle, friction members secured to the other end of the said spindle, and a rotatable and pivotally movable, bevel-faced driving friction member secured to the frame at one side of the spindle, the said beveled driving friction member being rotatable in one direction only and adapted to coöperate alternately with each one of the said friction members, in order to rotate the spindle in either rotary direction and thereby raise and lower the said ram, substantially as described.

3. A friction-actuated screw-press particularly for punching-, bending- and drawing operations, comprising in combination, a spindle adapted to be rotated in either rotary direction, a ram secured to one end of the spindle, friction members secured to the other end of the said spindle, a rotatable and pivotally movable driving friction member secured to the frame beside the spindle, the said driving friction member being rotatable in one direction only and adapted to coöperate alternately with either one of the said friction members, in order to rotate the spindle in either rotary direction and thereby raise and lower the said ram, and a lever traversing the said frame in about the mean plane of the spindle, one end of said lever extending into the path of movement of the said ram and the other end thereof being pivotally secured to a rod, one end of which rod is provided with a pedal while the other end thereof is pivotally attached to the said driving friction member, substantially as and for the purpose set forth.

4. A friction-actuated screw-press particularly for punching-, bending- and drawing operations, comprising in combination, a frame carrying a screw-threaded bearing, a screw-threaded spindle adapted to rotate in either rotary direction passing through the said bearing, a ram secured to one end of the spindle, friction members secured to the other end of the said spindle, the said friction members being bell-shaped in order to locate the flywheel-masses of the same as low as possible and reduce the lateral pressure of the spindle against the wall of the said bearing, and a rotatable and pivotally movable driving friction member secured to the said frame at the side of the said spindle, the said driving friction member being rotatable in one direction only and adapted to coöperate alternately with each one of the said friction members, in order to rotate the spindle in either rotary direction and thereby to either raise or lower the said ram, substantially as described.

5. A friction-actuated screw-press particularly for punching-, bending- and drawing operations, comprising in combination, a bearing, a screw-threaded spindle adapted to rotate in either rotary direction passing through the said bearing, a ram secured to one end of the spindle, friction members secured to the other end of the said spindle, the said friction members being bell-shaped in order to locate the flywheel-mass of the same at a low level and to reduce the lateral pressure of the spindle against the wall of the said bearing, a rotatable and pivotally movable driving friction member secured to the said frame beside the said spindle, the said driving friction member being rotatable in one direction only and adapted to coöperate alternately with each one of the said friction members, in order to rotate the spindle in either rotary direction and thereby raise and lower the said ram, and a lever traversing the said frame at about the mean-level of the spindle, one end of this lever extending into the path of movement of the said ram and the other end thereof being pivotally secured to a rod, one end of said rod being provided with a pedal while the other end thereof is pivotally attached to the said driving friction member, substantially as and for the purpose set forth.

In testimony whereof we affix our signatures in presence of two witnesses.

RUDOLF THEUMER.
FERDINAND SCHAR.

Witnesses:
 CARL KÜPPER,
 ROBERT BRUNNER.